US009422113B2

(12) United States Patent
Glock et al.

(10) Patent No.: US 9,422,113 B2
(45) Date of Patent: Aug. 23, 2016

(54) APPARATUS AND METHOD FOR TRANSFERRING CONTAINERS TO A HANDLING MACHINE

(71) Applicant: Groninger GmbH & Co. KG, Schnelldorf (DE)

(72) Inventors: Ralf Glock, Kressberg/Rudolfsberg (DE); Michael Steck, Gerabronn/Amlishagen (DE)

(73) Assignee: Groninger GmbH & Co. KG, Schnelldorf (DE)

( * ) Notice: Subject to any disclaimer, the term of this patent is extended or adjusted under 35 U.S.C. 154(b) by 0 days.

(21) Appl. No.: 14/677,200

(22) Filed: Apr. 2, 2015

(65) Prior Publication Data
US 2015/0284190 A1    Oct. 8, 2015

(30) Foreign Application Priority Data

Apr. 4, 2014   (DE) .......................... 10 2014 104 810

(51) Int. Cl.
*B65G 33/02*    (2006.01)
*B65G 19/02*    (2006.01)
(Continued)

(52) U.S. Cl.
CPC ................ *B65G 33/02* (2013.01); *B65G 19/02* (2013.01); *B65G 33/265* (2013.01); *B65G 43/00* (2013.01);
(Continued)

(58) Field of Classification Search
CPC ........ B65G 19/02; B65G 33/02; B65G 33/04; B65G 33/265; B65G 43/00; B65G 47/26; B65G 47/28; B65G 47/30; B65G 47/71; B65G 47/715; B65G 47/82; B65G 2201/0235; B65G 2201/0261; B65G 2811/0631; B65G 2812/05

USPC .................... 198/426, 429, 459.3, 459.4, 597
See application file for complete search history.

(56) References Cited

U.S. PATENT DOCUMENTS 3,987,889 A * 10/1976 Godoy ................... B65G 47/82
   198/429
4,039,072 A *  8/1977 Keller .................. B65G 47/086
   198/427

(Continued)

FOREIGN PATENT DOCUMENTS

DE         3149307       6/1983
DE    102011079077 A1    1/2013
(Continued)

OTHER PUBLICATIONS

European Extended Search Report dated Sep. 18, 2015, 8 pages.
(Continued)

*Primary Examiner* — Leslie A Nicholson, III
*Assistant Examiner* — Keith R Campbell
(74) *Attorney, Agent, or Firm* — Reising Ethington, P.C.

(57) ABSTRACT

An apparatus for transferring containers to a handling machine that handles the containers cyclically in groups, comprising a conveying unit for transporting the containers in a conveying direction, wherein the conveying unit has a sliding section in which a group of containers is displaceable towards the handling machine in a sliding direction oriented transversely to the conveying direction, a sliding device for displacing the group of containers from the conveying unit to the handling machine in the sliding direction, and having a screw conveyor for setting a pitch spacing between the containers, the pitch spacing being required for handling the group of containers in the handling machine, the screw conveyor is oriented along the conveying unit, wherein the screw conveyor projects at least partially into the sliding section, and the screw conveyor has at least one gap region in which the screw conveyor has a reduced outer circumference.

16 Claims, 4 Drawing Sheets

(51) Int. Cl.
*B65G 33/26* (2006.01)
*B65G 43/00* (2006.01)
*B65G 47/28* (2006.01)
*B65G 47/71* (2006.01)
*B65G 33/04* (2006.01)
*B65G 47/82* (2006.01)

(52) U.S. Cl.
CPC ............... *B65G 47/28* (2013.01); *B65G 47/71* (2013.01); *B65G 33/04* (2013.01); *B65G 47/82* (2013.01); *B65G 2201/0235* (2013.01); *B65G 2201/0261* (2013.01); *B65G 2811/0631* (2013.01); *B65G 2812/05* (2013.01)

(56) References Cited

U.S. PATENT DOCUMENTS

| | | | | |
|---|---|---|---|---|
| 4,290,517 | A | | 9/1981 | Hafferkamp |
| 4,638,903 | A | * | 1/1987 | Kimura ................ B65G 47/086 198/418.5 |
| 4,929,140 | A | * | 5/1990 | Baker ................... B65G 65/00 198/409 |
| 6,035,995 | A | | 3/2000 | Leidy |
| 6,176,369 | B1 | | 1/2001 | Petrovic |
| 6,386,353 | B1 | | 5/2002 | Gerber |
| 8,939,749 | B2 | | 1/2015 | Winzinger |
| 2003/0057058 | A1 | * | 3/2003 | Iwasa ..................... B65B 5/064 198/419.3 |
| 2011/0302884 | A1 | * | 12/2011 | Monti .................... B65B 3/003 53/281 |

FOREIGN PATENT DOCUMENTS

EP 2394915 A1 12/2001
GB 2049600 12/1980

OTHER PUBLICATIONS

English Translation of European Extended Search Report dated Sep. 18, 2015, 8 pages.
German Examination Report, 8 pages.
English Translation of German Examination Report, 8 pages.
German Continued Examination Report for Application No. 102014104810.5 Dated Apr. 13, 2016, 6 pages.
English Translation of Continued German Examination Report for Application No. 102014104810.5 Dated Apr. 13, 2016, 6 pages.

* cited by examiner

APPARATUS AND METHOD FOR TRANSFERRING CONTAINERS TO A HANDLING MACHINE

This application claims priority to German patent application DE 10 2014 104 810.5, filed Apr. 4, 2014.

FIELD

The invention relates to an apparatus for transferring containers to a handling machine that handles the containers cyclically in groups.

Furthermore, the invention relates to a system having a handling machine for cyclically handling a group of containers, and an apparatus of the abovementioned type.

Furthermore, the invention relates to a method for transferring containers to a handling machine that handles the containers cyclically in groups.

The abovementioned system may be used, for example, for processing pharmaceutical and/or cosmetic fluid media. However, other fields of use are also conceivable.

BACKGROUND

It is generally conventional to provide what is referred to as a front table, or a machine region having transport elements, on handling machines, for example filling machines, capping machines and/or labeling machines, the containers to be handled being fed to the handling machine via said front table or machine region. The front table thus forms the actual container in-feed of the overall system consisting of the front table and handling machine. In this case, for example a conveying belt for conveying the containers can be provided at the front table. The containers are separated out, or a corresponding Pitch spacing between the containers is set, usually by a screw conveyor. The screw conveyor is arranged generally parallel to the conveying belt and has screw channels with a pitch that sets the containers to a particular pitch spacing corresponding to the pitch of the handling machine. The greater the spacing between the containers is intended to be, the greater the pitch of the screw conveyor has to be for the same length of the screw conveyor. However, the greater pitch of the screw channels results in very unstable container guidance. Alternatively, the screw conveyor has to have a greater length if a greater pitch spacing between the containers is intended to be set. However, this results in an increased space requirement for the overall system. Furthermore, the screw conveyor usually has a drive which is located in continuation of the screw conveyor towards the front table of the handling machine. However, it is difficult to fit the drive for the screw conveyor in the front table of the handling machine.

Located downstream of the screw conveyor, as seen in the conveying direction, is usually an in-feed starwheel, which has on its circumference a number of recesses (pockets) for receiving the containers, said recesses being open towards said circumference and being distributed at regular angular spacings. The containers are conveyed into the pockets of the in-feed starwheel at the predetermined pitch spacing by the screw conveyor. The received containers are moved on a partially circular conveying path by the in-feed starwheel. In order in this case to keep the containers in the recesses of the in-feed starwheel, a securing element is generally provided on the partially circular conveying path of the in-feed starwheel, said securing element enclosing the in-feed starwheel on its partially circular conveying path. In this case, the securing element can be configured for example as an outer guide rail. In order to ensure that the containers are held securely in the recesses of the in-feed starwheel, the spacing between the guide rail and the in-feed starwheel has to be adapted to the dimensions of the containers to be conveyed. If the container size is changed, the corresponding guide rail therefore also has to be exchanged, for example. Thus, increased conversion complexity arises in the known arrangement of screw conveyor and downstream in-feed starwheel, if the container size is changed. This in turn results in increased costs in the conversion of the overall system.

It is therefore an objective to provide an improved apparatus, a system having such an apparatus and an improved method for transferring containers to a handling machine that handles the containers cyclically in groups, this apparatus, system and method addressing at least some of the abovementioned drawbacks.

SUMMARY

Therefore, according to one aspect of the invention, there is provided an apparatus for transferring containers to a handling machine that handles the containers cyclically in groups, having a conveying unit for transporting the containers in a conveying direction, wherein the conveying unit has a sliding section in which a group of containers is displaceable towards the handling machine in a sliding direction oriented transversely to the conveying direction, a sliding device for displacing the group of containers from the conveying unit to the handling machine in the sliding direction, and having a screw conveyor for setting a pitch spacing between the containers, said pitch spacing being required for handling the group of containers in the handling machine, wherein the screw conveyor is oriented along the conveying unit, wherein the screw conveyor projects at least partially into the sliding section, and wherein the screw conveyor has at least one gap region in which the screw conveyor has a reduced outer circumference.

Furthermore, according to another aspect of the invention, it is provided a system having a handling machine for cyclically handling a group of containers, and having an apparatus for transferring containers to a handling machine that handles the containers cyclically in groups, having a conveying unit for transporting the containers in a conveying direction, wherein the conveying unit has a sliding section in which a group of containers is displaceable towards the handling machine in a sliding direction oriented transversely to the conveying direction, a sliding device for displacing the group of containers from the conveying unit to the handling machine in the sliding direction, and having a screw conveyor for setting a pitch spacing between the containers, said pitch spacing being required for handling the group of containers in the handling machine, wherein the screw conveyor is oriented along the conveying unit, wherein the screw conveyor projects at least partially into the sliding section, and wherein the screw conveyor has at least one gap region in which the screw conveyor has a reduced outer circumference.

Furthermore, according to another aspect of the invention, it is provided a method for transferring containers to a handling machine that handles the containers cyclically in groups, comprising the steps of: transporting the containers in a conveying direction by means of a conveying unit, wherein the conveying unit has a sliding section in which a group of containers is displaceable towards the handling machine in a sliding direction oriented transversely to the conveying direction by means of a sliding device, setting a pitch spacing between the containers, said pitch spacing being required for handling the group of containers in the handling machine, by means of a screw conveyor, wherein the screw conveyor is oriented along the conveying unit, wherein the screw conveyor projects at least partially into the sliding section, and wherein the screw conveyor has at least one gap region in which the screw conveyor has a reduced outer circumference, and displacing the group of containers from the conveying unit to the handling machine in the sliding direction by means of the sliding device.

A handling machine is understood in the present case to be a machine which is used for handling containers. This can be for example a machine for filling the containers with fluids, a machine for labeling the containers and/or a machine for capping the containers.

In order to handle the containers, the handling machine usually has what are referred to as handling members which are at a particular spacing, referred to as the pitch spacing, apart. In order to handle the containers in the handling machine, it is therefore necessary to arrange the containers, prior to handling in the handling machine, such that the spacing between the containers corresponds to the pitch spacing. In this case, the pitch spacing can correspond for example to the spacing between the central axes of the containers, wherein the containers have corresponding filling openings for filling the containers in the region of the central axes.

In the case of the apparatus, the handling machine is arranged in the sliding direction on one side of the conveying unit, which can be configured for example as a conveying belt. Arranged on the opposite side of the conveying unit is the sliding device, which is configured to displace the group of containers from the conveying unit to the handling machine in the sliding direction. The screw conveyor projects at least partially into the sliding section. In other words, the screw conveyor is thus located between the sliding device and the handling machine. As a result of this arrangement of the screw conveyor, the displacement of the containers from the conveying unit to the handling machine would be prevented in known transfer apparatuses, since access of the sliding device to the containers is prevented by the interposed screw conveyor.

However, the screw conveyor has at least one gap region in which the screw conveyor has a reduced outer circumference. With the aid of the gap region, access of the sliding device to the containers, and thus displacement of the containers from the conveying unit to the handling machine, are allowed.

As a result of the at least partial arrangement of the screw conveyor in the sliding section, a very space-saving solution can be achieved. In the event of a change in the container size, only the screw conveyor has to be adapted in a corresponding manner.

In a refinement, the sliding device for displacing at least one container of the group of containers from the conveying unit to the handling machine is arranged such that it is guidable at least sectionally through the gap region in the sliding direction.

In this refinement, the sliding device is configured to act on the containers through the gap region in order to shift the containers from the conveying unit to the handling machine in the sliding direction. In this case, the gap region can be configured for example as an annular groove, wherein the annular groove has a smaller outer circumference than the remaining regions of the screw conveyor. Alternatively, the screw conveyor can have one or more connecting elements in the gap region, said connecting elements defining a reduced outer circumference compared with the remaining regions of the screw conveyor. Preferably, a longitudinal axis of the gap region is furthermore oriented at right angles to the sliding direction. As a result, the sliding device can be guided at least sectionally through the gap region in the sliding direction.

According to a further refinement, each of the containers is a transport basket having a fluid receptacle accommodated therein.

The fluid receptacle can be for example a vessel, for example a bottle, which is configured to receive a fluid. The fluid receptacle is detachably fixed to the transport basket. The transport basket is in turn transported by the conveying unit in the conveying direction. The sliding device acts on the transport basket in order to displace the transport basket, together with the fluid receptacle accommodated therein, from the conveying unit to the handling machine in the sliding direction. The pitch spacing is defined in this refinement via the spacing between the fluid receptacles. With the aid of the transport baskets, it is also possible to transfer or handle fluid receptacles which could not be stably transported and/or displaced on their own.

In a further refinement, the conveying direction and the sliding direction form a substantially horizontal plane in an operating position of the apparatus.

In other words, in this refinement, the containers are transported in a substantially horizontal manner with the aid of the conveying unit and are subsequently offset laterally with respect to the handling machine with the aid of the sliding device.

According to a further refinement, the screw conveyor has a worm thread, wherein the pitch spacing between the containers is settable in dependence on a pitch of the worm thread.

In this case, the pitch spacing becomes greater when a greater pitch of the worm thread is selected. In particular, the pitch spacing can only be increased in relation to the size of the containers or transport baskets that are used.

On account of the worm thread, the screw conveyor has an outside diameter and a core diameter, wherein the core diameter is smaller than the outside diameter. In the gap region, the screw conveyor furthermore has an outer circumference which is smaller than the core diameter.

In a further refinement, the screw conveyor has a plurality of gap regions, wherein the number of gap regions corresponds at least to the number of containers in the group of containers.

In this refinement, provision can be made for example of one gap region per container in the screw conveyor. In this way, parts of the sliding device can be guided through each of the gap regions in order to transfer the group of containers from the conveying unit to the handling machine.

In a refinement, the gap regions are each at an axial spacing apart in the conveying direction, said spacing corresponding to the pitch spacing of the containers.

In this way, the sliding device can be arranged such that at least parts of the sliding device can be guided through the gap regions in the sliding direction in order to displace the containers towards the handling machine. Each of the containers of the group of containers may be assigned exactly one gap region in this refinement.

According to a further refinement, the number of gap regions corresponds to twice the number of containers in the group of containers.

In other words, in this refinement, each of the containers in the group of containers is assigned two gap regions. In this way, the sliding device can be guided at least sectionally through two gap regions in order to exert a force on a container, with the result that the container is transferred to the handling machine. On account of the two points of application for the force exerted by the sliding device, the container is prevented from tilting during the sliding operation.

In a further refinement, the sliding device has at least one sliding unit.

If, for example, only one sliding unit is provided, all of the containers in the group of containers are transferred by this one sliding unit to the handling machine. In an alternative refinement, the sliding device can have a plurality of sliding units, wherein each of the containers of the group of containers is assigned its own sliding unit. It goes without saying that provision can also be made of any desired other number of sliding units.

According to a further refinement, the sliding unit has at least one sliding element which is guidable through the gap region beneath and/or above the reduced outer circumference of the screw conveyor.

For example, the sliding element can have a pin which is guided through the gap region beneath or above the reduced outer circumference of the screw conveyor, in order to displace one of the containers of the group of containers from the conveying unit to the handling machine. Alternatively, the sliding element can be formed in a U-shaped manner with two legs, wherein one of the legs of the sliding element is guidable through the gap region beneath the reduced outer circumference of the screw conveyor and the other of the legs is guidable through the gap region above the reduced outer circumference of the screw conveyor, in order to act on one of the containers of the group of containers. As a result of the U-shaped configuration of the sliding element, a tendency to tilt during displacement of the container is reduced.

According to a further refinement, the sliding unit has an actuator which is configured to displace the at least one sliding element in the sliding direction.

With the aid of the actuator, the sliding unit can be moved precisely in the sliding direction. Thus, a precise stroke for the displacement of the containers can be set.

In this case, the actuator is preferably adjustable mechanically, hydraulically, pneumatically and/or electrically.

In a further refinement, the apparatus furthermore has a control unit which is configured to actuate the actuator.

With the aid of the control unit, exact control times for the operation of the sliding device can be programmed. This in turn allows very efficient feeding of the handling machine. For example, filling times for filling the containers can be adapted precisely to a conveying speed of the conveying unit.

In a further refinement, the sliding device has a plurality of sliding units, wherein each of the sliding units is assigned in each case to a gap region.

In this refinement, the displacement of each container of the group of containers is individually adaptable. For example, this allows a temporal offset between the individual displacement operations for the containers.

According to a particular refinement of the system, the sliding device and the handling machine are arranged on opposite sides of the conveying unit, as seen in the sliding direction.

In this way, the sliding device can transfer the group of containers from the conveying unit to the handling machine in the sliding direction, wherein the sliding direction is oriented at right angles to the conveying direction of the conveying unit.

The screw conveyor preferably projects into the sliding section and thus into a region between the sliding device and the handling machine.

On account of the gap regions of the screw conveyor, however, the sliding device is allowed to access the group of containers. This results in a space-saving solution for the system.

According to a particular refinement of the method, the sliding device for displacing at least one container of the group of containers from the conveying unit to the handling machine in the sliding direction is guided at least sectionally through the gap region.

Since the sliding device for displacing the containers is guided at least sectionally through the gap region, a very compact construction of the apparatus can be achieved.

It goes without saying that the abovementioned features and those which are yet to be explained below are usable not only in the combination specified in each case, but also in other combinations or on their own, without departing from the scope of the present invention.

It furthermore goes without saying that the features, properties and ad-vantages of the apparatus according to the invention also apply or are applicable in a corresponding manner to the method according to the invention.

DRAWINGS

Exemplary embodiments of the invention are illustrated in the drawing and are explained in more detail in the following description. In the drawing.

DESCRIPTION

Figure 1:
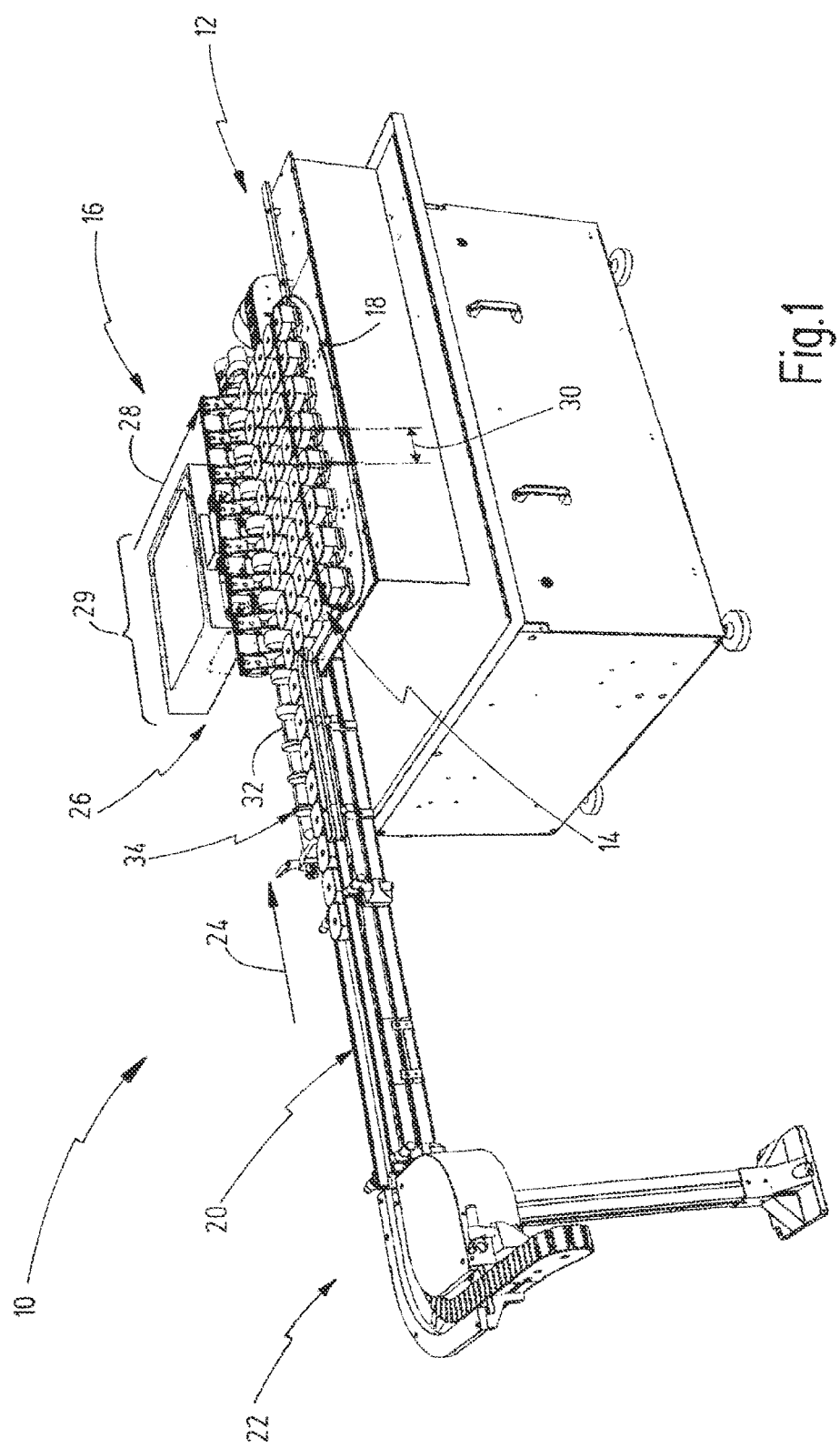
FIG. 1 shows an embodiment of a system having an apparatus according to the invention for transferring containers to a handling machine.

FIG. 1 shows a system 10 which has a handling machine 12 for handling containers 14, and an apparatus 16 for transferring the containers 14 to the handling machine 12.

The handling machine 12 can be configured for example as a filling machine, capping machine or labeling machine which has handling members not shown in FIG. 1 by means of which the containers 14 are filled with fluids, capped and/or labeled. In this case, the handling machine is configured to handle the containers 14 cyclically in groups 18. In other words, the containers 14 of a group 18 are simultaneously for example filled with fluid, capped and/or labeled in one operating cycle of the handling machine 12.

In the embodiment illustrated in FIG. 1, the containers 14 themselves form a fluid receptacle for receiving a fluid. In an alternative configuration, each of the containers 14 can be a transport basket having a fluid receptacle accommodated therein. For the exemplary embodiment described, it should be assumed that the containers 14 are filled with a fluid in the handling machine 12. It goes without saying that the containers 14 can subsequently be capped and labeled in further, not shown processing stations of the system 10.

The apparatus 16 has a conveying belt 20 which transports the containers 14 from a front table 22 to the handling machine 12 in a conveying direction 24. Furthermore, the apparatus 16 has a sliding device 26 which is configured to displace a group 18 of containers 14 from the conveying belt 20 to the handling machine 12 in a sliding direction 28. In this case, the sliding direction 28 is oriented transversely, or at right angles, to the conveying direction 24. Furthermore, the conveying direction 24 and the sliding direction 28 form a substantially horizontal plane in an operating position of the apparatus 16. In other words, the sliding device 26 is configured to transfer the containers 14 fed in the conveying direction 24 laterally in groups into the handling machine 12 in the sliding direction 28. To this end, the sliding device 26 and the handling machine 12 are arranged on opposite sides of the conveying belt 20, as seen in the sliding direction 28. The region of the conveying belt 20 in which the group 18 of containers 14 is slid from the conveying belt 20 into the handling machine 12 will be referred to as a sliding section 29 in the following.

In order for the containers 14 to be handled in the handling machine 12, the containers 14 have to be at a predefined pitch spacing 30 apart. In this case, the pitch spacing 30 is defined for example as the spacing between the central axes of the containers 14. For example, a receiving opening for receiving a fluid into the container 14 can be located in the region of the central axis of a container. Since the pitch spacing 30 is predefined by the handling members, for example filling members, of the handling machine 12, the containers 14 first all have to be set to the pitch spacing 30 before they are transferred into the handling machine 12 by means of the sliding device 26. To this end, the apparatus 16 has a screw conveyor 32 which is configured to set the pitch spacing 30 between the containers 14. The screw conveyor 32 is oriented along the conveying belt 20, preferably parallel to the conveying belt 20. In the embodiment of the apparatus 16 that is illustrated in FIG. 1, the screw conveyor 32 projects into the sliding section 29 and completely covers the latter. In an alternative embodiment, it is also possible for the screw conveyor 32 only to project partially into the sliding section 29.

Since the screw conveyor 32 is arranged between the sliding device 26 and the handling machine 12 in the present case, a very compact construction of the apparatus 16 and thus of the system 10 is achieved.

The screw conveyor 32 has a worm thread 34 for setting the pitch spacing 30. The greater the pitch spacing 30 is intended to be, the greater the pitch of the worm thread 34 has to be for the same length of the screw conveyor 32. In other words, the pitch of the worm thread 34 is selected in dependence on the pitch spacing 30 to be set.

During operation of the apparatus 16, the containers 14 are first of all transported by means of the conveying belt 20 to the sliding section 29, which is located in the region of the handling machine 12. In this case, the containers 14 are transported in the conveying direction 24. By means of the screw conveyor 32, the pitch spacing 30 that is required for the group 18 of containers 14 to be handled in the handling machine 12 is subsequently set. In a further step, the group 18 of containers 14 is displaced by means of the sliding device 26 from the conveying belt 20 to the handling machine 12 in the sliding direction 28. In the handling machine 12, the containers 14 are filled with a fluid for example with the aid of corresponding filling members. The filled containers 14 are subsequently guided out of the handling machine 12 and subjected to a possible further handling step.

In the following figures, further views and embodiments of the apparatus 16 and of the system 10, respectively, are shown. These views and embodiments generally correspond in terms of structure and operation to the apparatus 16 and the system 10 in FIG. 1. Therefore, the same elements are characterized by the same reference signs. In the following text, further details and possible differences are explained.

Figure 2:
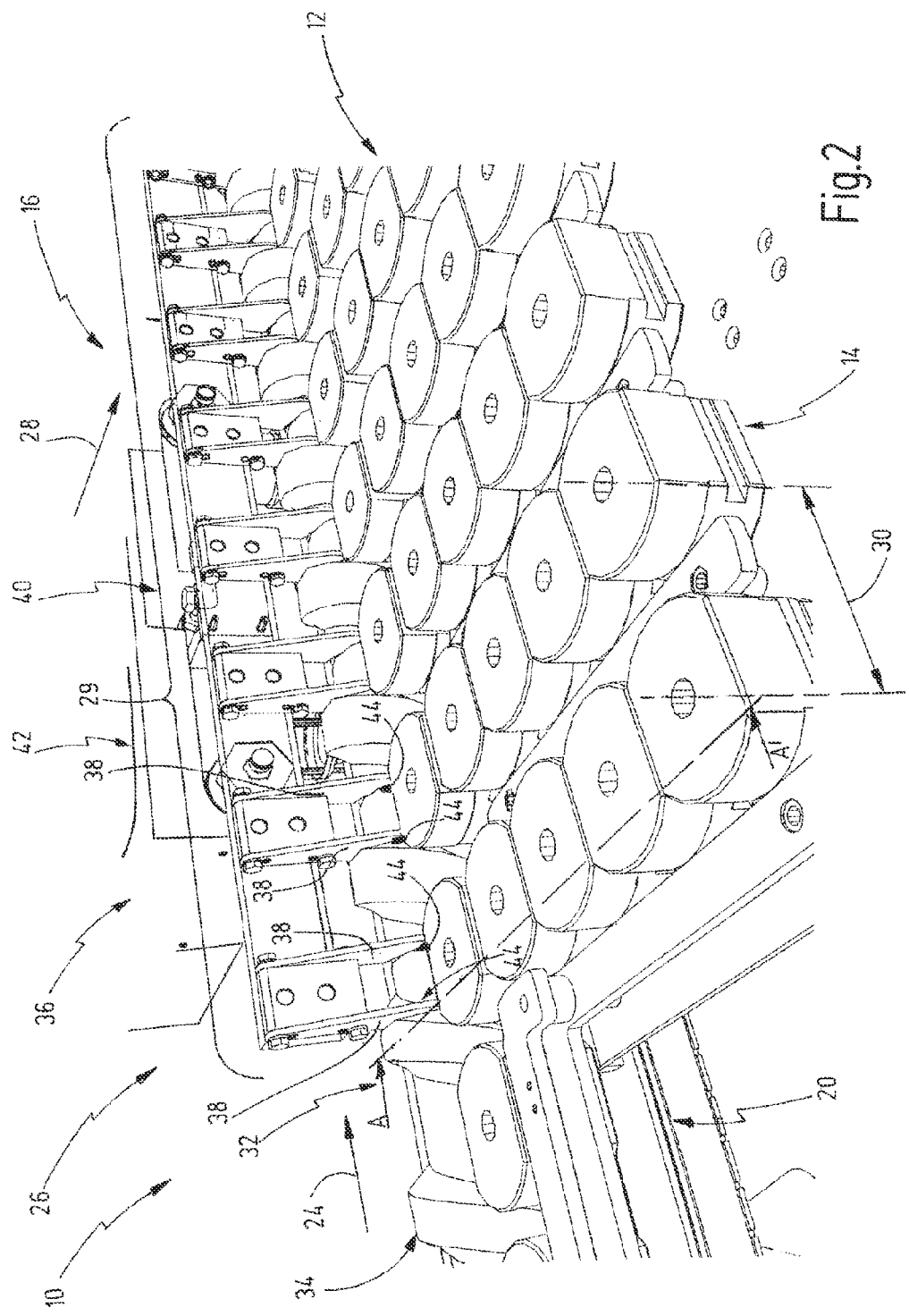
FIG. 2 shows an enlarged view of a detail of the system shown in FIG. 1.

FIG. 2 shows an enlarged view of a detail of the system 10 shown in FIG. 1.

As can be gathered from FIG. 2, the sliding device 26 has a sliding unit 36 which is configured to transfer a group of containers 14 (not designated any more specifically in FIG. 2) from the conveying belt 20 to the handling machine 12. Alternatively, the sliding device 26 can also have a plurality of sliding units.

The sliding unit 36 has a plurality of sliding elements 38, wherein only some of the sliding elements 38 have been provided with the associated reference signs in FIG. 2 for reasons of clarity. In the embodiment of the apparatus 16 that is illustrated in FIG. 2, in each case two sliding elements 38 are assigned to one container 14 from the group of containers 14. As a result of the two sliding elements 38, tilting of the container 14 during the sliding operation from the conveying belt 20 to the handling machine 12 can be avoided.

The sliding unit 36 furthermore has an actuator 40 which is configured to displace the sliding elements 38 in the sliding direction 28. As a result of the displacement of the sliding elements 38, the latter exert a force on the group of containers 14, with the result that the group of containers 14 is slid from the conveying belt 20 into the handling machine 12. In this case, the actuator 40 is adjustable for example pneumatically. Alternatively, however, the actuator 40 can also be adjustable mechanically, hydraulically and/or electrically.

Furthermore, the apparatus 16 has a control unit 42 which actuates the actuator 40 in order to transfer the group of containers 14 to the handling machine 12.

As a result of the arrangement of the screw conveyor 32 in the sliding section 29 and thus between the sliding device 26 and the handling machine 12, it would be impossible to displace the containers 14 in known systems, since the screw conveyor 32 blocks access of corresponding sliding elements to the containers 14.

The present screw conveyor 32 therefore has corresponding gap regions 44 through which the sliding elements 38 can be guided. As already noted for the sliding elements 38, only some of the gap regions 44 have been provided with the corresponding reference signs in FIG. 2 for reasons of clarity.

Figure 3:
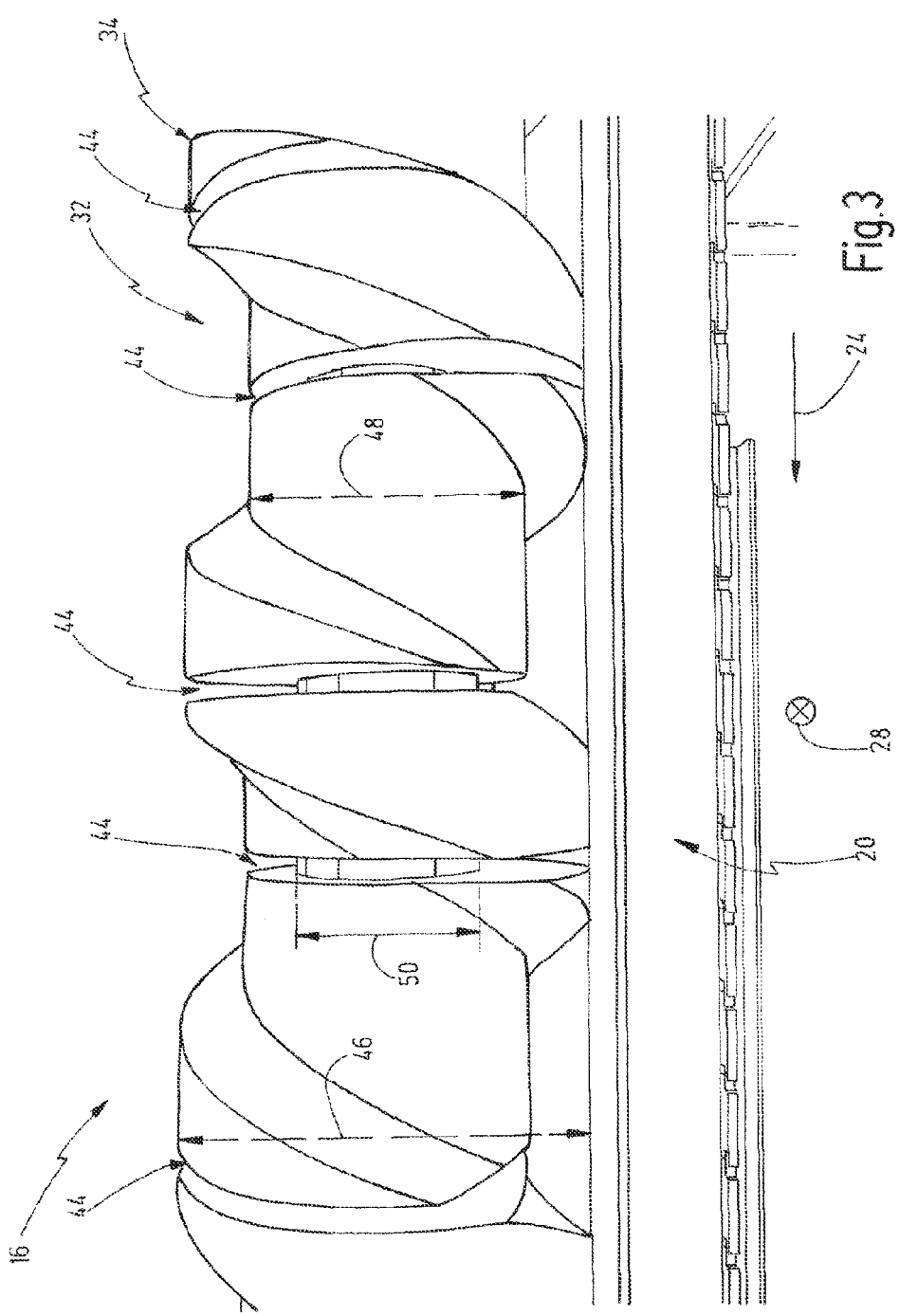
FIG. 3 shows a detail illustration of an embodiment of a screw conveyor of the apparatus.

Details of an exemplary configuration of the gap regions 44 can be gathered from FIG. 3. To this end, FIG. 3 shows a detail illustration of the screw conveyor 32 from a viewing angle of the sliding device 26 in the sliding direction 28. For reasons of clarity, the sliding device 26 is not illustrated in FIG. 3.

On account of the worm thread 34, the screw conveyor 32 has an outside diameter 46 and a core diameter 48. As can be gathered from FIG. 3, the gap regions 44 have a reduced outer circumference with a gap diameter 50 which is smaller than the outside diameter 46 and the core diameter 48. The gap region 44 can be embodied as an annular groove. However, the gap region 44 can also have any desired other shape which results in a reduced outer circumference of the screw conveyor 32.

According to the embodiments of the apparatus 16 that are illustrated in FIGS. 1 to 3, in each case two gap regions 44 are assigned to one of the containers 14 from the group 18 of containers. In each case one sliding element 38 can be guided through each of the gap regions 44. It goes without saying that in an alternative configuration of the apparatus 16, any desired other number of gap regions 44 can be provided per container 14 from the group 18 of containers 14. For example, it is also possible to provide only one gap region 44 per container 14.

Figure 4:
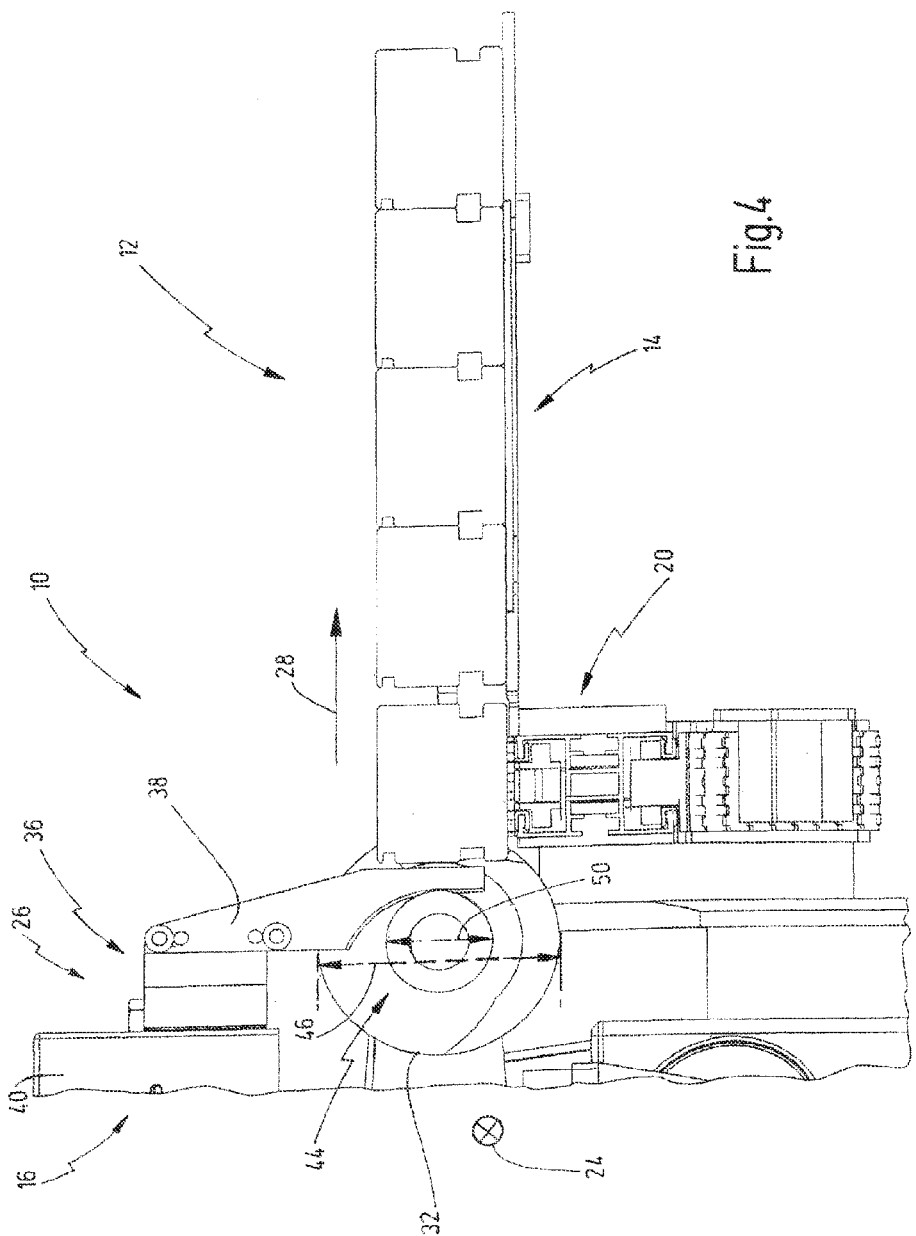
FIG. 4 shows a sectional view of the system shown in FIG. 2.

In order to illustrate the sliding elements 38 and the gap regions 44, a sectional view along the dashed line A-A' of the system 10 shown in FIG. 2 is shown in FIG. 4.

It can be seen from this sectional view that in this embodiment the sliding elements 38 are guided through the associated gap regions 44 above the reduced outer circumference (see gap diameter 50 in FIG. 4). In this case, the sliding elements 38 have a lever-like shape. In an alternative configuration, the sliding elements 38 can also be formed in a U-shaped manner with in each case two legs, such that one of the legs is guided through the associated gap region 44 above the reduced outer circumference and the other of the legs is guided through the associated gap region 44 beneath the reduced outer circumference. It goes without saying that the sliding elements 38 can also have any desired other shape which allows the sliding elements 38 to be guided through the associated gap regions 44 in order to exert a force on the containers 14 in the sliding direction 28.

The invention claimed is:

1. A system having:
   a handling machine for cyclically handling a group of containers;
   an apparatus for transferring containers to the handling machine that handles the containers cyclically in groups, the apparatus comprising:
      a conveying unit for transporting the containers in a conveying direction, wherein the conveying unit has a sliding section in which a group of containers is displaceable towards the handling machine in a sliding direction oriented transversely to the conveying direction;
      a sliding device for displacing the group of containers from the conveying unit to the handling machine in the sliding direction;
      and a screw conveyor for setting a pitch spacing between the containers, said pitch spacing being required for handling the group of containers in the handling machine, wherein the screw conveyor is oriented along the conveying unit, wherein the screw conveyor projects at least partially into the sliding section, and wherein the screw conveyor has at least one gap region in which the screw conveyor has a reduced outer circumference, wherein the sliding device for displacing at least one container of the group of containers from the conveying unit to the handling machine in the sliding direction is guided at least sectionally through the gap region, and wherein the number of gap regions corresponds to twice the number of containers in the group of containers.

2. The system according to claim 1, wherein each of the containers is a transport basket having a fluid receptacle accommodated therein.

3. The system according to claim 1, wherein the conveying direction and the sliding direction form a substantially horizontal plane in an operating position of the apparatus.

4. The system according to claim 1, wherein the screw conveyor has a worm thread, and wherein the pitch spacing between the containers is settable in dependence on a pitch of the worm thread.

5. The system according to claim 1, wherein the gap regions are each at an axial spacing apart in the conveying direction, said spacing corresponding to the pitch spacing.

6. The system apparatus according to claim 1, wherein the sliding device has at least one sliding unit.

7. The system according to claim 6, wherein the sliding unit has at least one sliding element which is guidable through the gap region beneath and/or above the reduced outer circumference of the screw conveyor.

8. The system according to claim 7, wherein the sliding unit has an actuator which is configured to displace the at least one sliding element in the sliding direction.

9. The system according to claim 8, wherein the actuator is adjustable mechanically, hydraulically, pneumatically and/or electrically.

10. The system according to claim 8, wherein the apparatus furthermore has a control unit which is configured to actuate the actuator.

11. The system according to claim 6, wherein the sliding device has a plurality of sliding units, wherein each of the sliding units is assigned in each case to a gap region.

12. The system according to claim 1, wherein the sliding device and the handling machine are arranged on opposite sides of the conveying unit, as seen in the sliding direction.

13. The system according to claim 1, wherein the screw conveyor projects in between the sliding device and the handling machine.

14. The system according to claim 6, wherein the at least one sliding unit has two sliding elements which are guidable through the gap region beneath and above the reduced outer circumference of the screw conveyor, respectively.

15. The system according to claim 1, wherein the handling machine is a filling machine that fills the group of containers simultaneously, and the sliding device and the handling machine are arranged on opposite sides of the conveying unit.

16. A method for transferring containers to a handling machine that handles the containers cyclically in groups, comprising the steps of:
   transporting the containers in a conveying direction by means of a conveying unit, wherein the conveying unit has a sliding section in which a group of containers is displaceable towards the handling machine in a sliding direction oriented transversely to the conveying direction by means of a sliding device;
   setting a pitch spacing between the containers, said pitch spacing being required for handling the group of containers in the handling machine, by means of a screw conveyor, wherein the screw conveyor is oriented along the conveying unit, wherein the screw conveyor projects at least partially into the sliding section, and wherein the screw conveyor has at least one gap region in which the screw conveyor has a reduced outer circumference; and
   displacing the group of containers from the conveying unit to the handling machine in the sliding direction by means of the sliding device, wherein the sliding device for displacing at least one container of the group of containers from the conveying unit to the handling machine in the sliding direction is guided at least sectionally through the gap region, and wherein the number of gap regions corresponds to twice the number of containers in the group of containers.

* * * * *